United States Patent [19]

Ziniel

[11] Patent Number: 5,390,341
[45] Date of Patent: Feb. 14, 1995

[54] SYSTEM AND METHOD FOR MUTING AND UNMUTING A COMMUNICATION DEVICE

[75] Inventor: Joseph M. Ziniel, Hanover Park, Ill.

[73] Assignee: Motorola, Inc., Schaumburg, Ill.

[21] Appl. No.: 729,669

[22] Filed: Jul. 15, 1991

[51] Int. Cl.$^6$ .............................................. H04B 7/00
[52] U.S. Cl. ..................................... 455/54.1; 455/70; 455/194.1; 455/297
[58] Field of Search ................... 455/194.1, 212, 58.1, 455/58.2, 89, 33.1, 54.1, 54.2, 56.1, 297, 68, 70, 200.1, 63; 379/59; 375/104

[56] References Cited

U.S. PATENT DOCUMENTS

| | | | |
|---|---|---|---|
| 4,414,687 | 11/1983 | Hirata | 455/194.1 |
| 4,517,561 | 5/1985 | Burke et al. | 455/58.1 X |
| 4,543,665 | 9/1985 | Sotelo et al. | 379/56 |
| 4,554,677 | 11/1985 | Smith et al. | 455/58.2 X |
| 4,627,107 | 12/1986 | Hohlfeld et al. | 455/89 X |
| 4,663,765 | 5/1987 | Sutphin et al. | 455/54.1 X |

Primary Examiner—Edward F. Urban
Attorney, Agent, or Firm—Pedro P. Hernandez

[57] ABSTRACT

A system (200) for muting a portable radio (104) includes a mobile radio (106) having a mute switch (108). Upon activating the mute switch (108), a signalling message is generated (ISW) by radio (106) that is in turn transmitted to the system central controller (202). The system central controller (202) then sends a mute signalling message (OSW) directed to portable radio (104). Upon decoding the signalling message, portable radio (104) is placed in a muted condition, thereby preventing the device from unmuting. Portable radio (104) can become automatically unmuted by either the pressing of the PTT switch found on radio (104) or by the radio user opening the door (116) of his vehicle (102).

10 Claims, 4 Drawing Sheets

SYSTEM AND METHOD FOR MUTING AND UNMUTING A COMMUNICATION DEVICE

TECHNICAL FIELD

This invention relates to communication systems, and more particularly to a system and method for muting a communication device.

BACKGROUND

Acoustic feedback conditions normally occur when two communication devices operating on the same frequency are close enough to each other. A typical example of this problem occurs when a police officer, who carries a portable radio, also has a mobile radio in his police car. Upon entering the police car with his portable radio turned on, acoustic feedback between the the portable and mobile sometimes occurs when the user begins using the mobile radio. The noise and disruption that is caused by the acoustic feedback forces the police officer normally to shut off his portable radio whenever the officer is inside his car. The problem with having to turn off the portable radio is that upon leaving the police car, the officer must remember to turn his portable radio back on, or else important communications may go unheard.

Given the major risk of losing valuable conversations which can sometimes be of a life threatening nature, a better way of controlling the muting of a radio is required when acoustic feedback is a problem.

SUMMARY OF THE INVENTION

The present invention provides an improved communication device and system for eliminating acoustic feedback. In the present invention the communication device includes user controls and operates in a communication system that transmits muting messages. The communication device comprises a receiver and a communication device controller means coupled to the receiver for muting the communication device upon the reception of the muting messages.

In one aspect of the present invention, a communication system comprises a first communication device having a transmitter for transmitting a muting message upon the activation of a mute control and for transmitting an unmute message upon the occurrence of a predetermined event. The communication system further includes a second communication device having a receiver and a communication device controller means coupled to the receiver for muting the communication device upon the reception of a muting message and unmuting the communication device upon the reception of an unmuting message.

DETAILED DESCRIPTION OF THE PREFERRED EMBODIMENT

Figure 1:
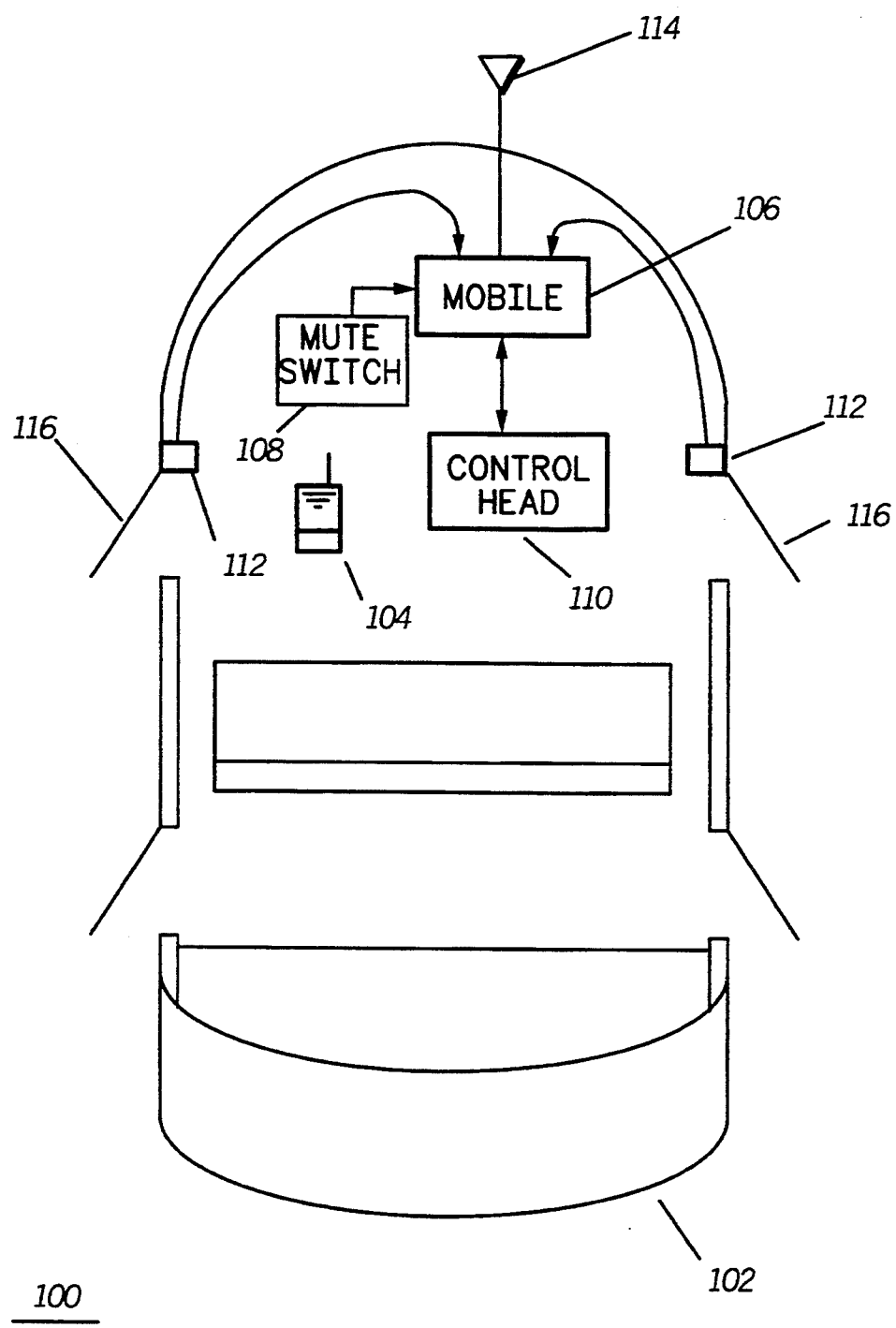
FIG. 1 is a block diagram of a vehicle having a set of communication devices in accordance with the present invention.

In FIG. 1, a vehicle 102, such as a car, having a set of communication devices (106 and 104) in accordance with the present invention, is shown. A vehicle system 100 includes a mobile radio 106 having a control head 110 for controlling the operations of the mobile radio 106. Control head 110, preferably contains a set of controls such as a keypad and display for changing the operating parameters (such as frequency of operation, mode of operation, etc.) of mobile radio 106. Coupled to mobile radio 106 is a mute control such as mute switch 108. Upon a person entering vehicle 102 with another communication device such as a portable radio 104, the activation of mute switch 108 sends a command to radio 104 forcing it into a mute condition in order to prevent acoustic feedback from occurring (the complete operation of how this is accomplished is discussed later). Once radio 104 is muted, it will stay muted until the radio user leaves his car at which time the opening of one of the car doors 116 will prompt the activation of a door switch 112.

The activation of one of the door switches 112 will send a signal to mobile 106, which will cause mobile 106 to transmit an unmute message to the communication system (shown in FIG. 2) which will in turn send an unmute message back to radio 104 which will unmute radio 104. Once radio 104 receives the unmute message it will return to normal operation. In the preferred embodiment, radio 104 will also unmute at any time that the radio's push to talk (PTT) switch is activated (or any other user control found on radio 104 such as a keypad, channel selector, etc.). This will allow for a quick override of the mute condition in radio 104 in case operation of radio 104 is required.

Figure 2:
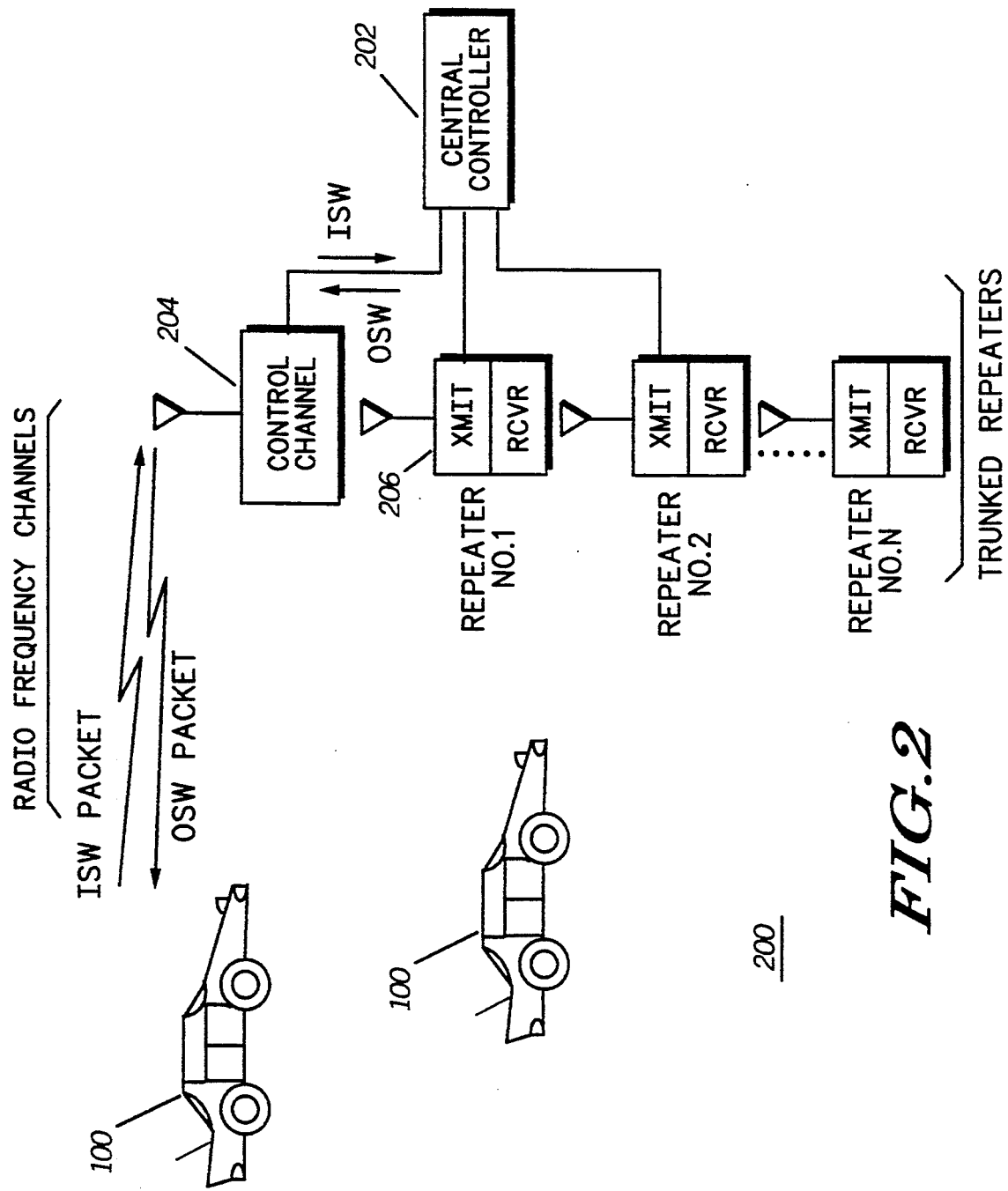
FIG. 2 is a communication system in accordance with the present invention.

In FIG. 2 a representation of a typical communication system 200 in accordance with the present invention is shown. Communication system 200 can be a trunked communication system as known in the art which includes the present invention. Trunked radio system 200 consists of a control system which is commonly referred to as a central controller 202, preferably a SMARTNET TM central controller manufactured by Motorola, Inc., which controls the assignment of repeaters 206 to different groups of communication devices, or in this particular case vehicle systems 100. Central controller 202 is basically a computerized station having an interface with a control channel repeater 204. Central controller 202 has appropriate management software for controlling all communication devices such as vehicle systems 100 which are part of trunked system 200. To better understand the system 200, an example of the sequence of events for a standard radio group call will be described.

When one of the vehicle systems 100 (i.e. in radio group A) that is in the system 200 presses the push-to-talk switch (PTT in mobile 106), a burst of data is transmitted by mobile 106 to the central controller 202 via the system control channel 204. The data sent is normally referred to as an inbound signalling word or ISW, which in this case constitutes a request for a voice channel. Preferably, any of the repeaters 206 except the one acting as the control channel 204 can be a voice/data channel 206. The central controller 202 upon reception of the ISW reviews the status of all the repeaters 206 and assigns an unused repeater 206 by sending an information signal, or as it is more commonly referred to, an outbound signalling word (OSW) via the control channel 204 directing all vehicle systems 100 in group A to a frequency corresponding to one of the repeaters 206 (i.e. repeater No. 1 or also known as channel No. 1).

The outbound signalling word is received by all vehicle systems 100, but only the vehicle systems 100 in group A will be transferred to repeater No. 1 (206). Since the OSW contains information regarding which vehicle systems 100 the information is for, the other vehicle systems 100 in the system will continue to monitor the control channel 204 for OSWs, until they receive an OSW which is directed to them. The individual vehicle system 100 which activated the PTT is now able to talk to any vehicle system 100 in his group over repeater No. 1 (206).

In the preferred embodiment all of the signaling occurs over the control channel 204 since the mute and unmute messages (OSW's and ISW's) are all data messages. Since they are all data messages, they do not require the granting of a voice channel 206 as discussed above.

Other implementations of trunked radio systems for use with the current invention can include systems 100 which do not have a dedicated control channel 204, but use each of the channels 206 in the system to transmit the necessary system control information. Other systems which can utilize the present invention can also include cellular telephone systems, non-trunked radio systems utilizing a base station and some form of signalling such as MDC 1200 TM (a 1200 baud digital signalling scheme manufactured by Motorola, Inc.), and other related systems which transmit information signals to communication devices.

Preferably, upon the activation of mute switch 108 the radio user will see a unique portable ID displayed on the mobile control head 110. The radio user can then either edit the unique ID via the control head keypad, or press the mobile PTT. Once the PTT is depressed, mobile 106 will generate an ISW that contains a "MUTE CODE" (muting message) and the portable's unique ID number. This ISW will be formatted by mobile 106 which will set up the mute code and portable ID into a standard ISW format.

Central controller 202 will receive the ISW via control channel 204 and will then turn the ISW into a corresponding OSW that contains the "MUTE CODE" and the portable's unique ID. At this point, portable 104 decodes the control channel Mute OSW and portable 104 then goes into a mute condition. The mute condition makes portable 104 go into a "sleep mode" where only the most critical transmissions such as an emergency call would unsquelch the radio's speaker.

In order to unmute the portable radio 104, either the pressing of the radio's PTT (or other user control found on the radio, e.g. keypad, etc.) or the opening of a selected door in vehicle 102 causes the radio 104 to unmute. In the case a selected vehicle door 116 is opened, a plunger type switch 112 activates, sending a signal to mobile 106 which in turn sends an "UNMUTE ISW" to central controller 202.

Upon receiving the ISW, central controller 202 sends a corresponding unmute OSW (unmute message) back to radio 104 that causes radio 104 to unmute and return back to it's normal operating condition. Preferably, upon receiving the unmute OSW, radio 104 generates a user signal such as a "chirp" to let the radio user know that the portable's speaker is now fully functional.

In the preferred embodiment of the present invention, a second way of unmuting radio 104 would preferably exist. The second way of unmuting radio 104, would be via an operator initiated PTT on the portable 104, or the activation of any other user control found on radio 104 (e.g. keypad, channel switch, etc.). This would allow the radio user, such as a police officer, to use his portable radio in the police car if required and override the present invention.

Figure 3A:
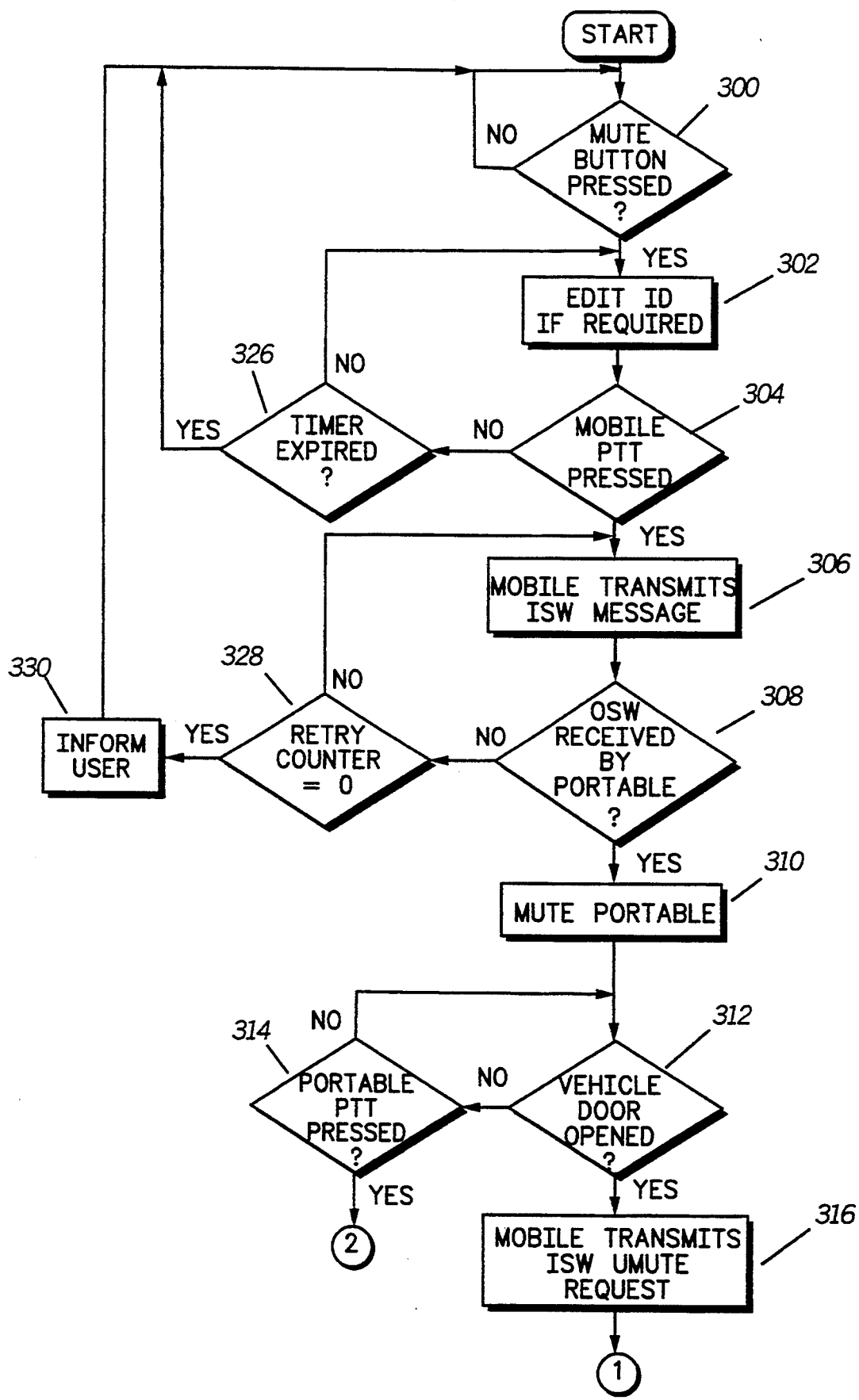
FIG. 3A is a flow diagram of a typical operation sequence in accordance with the present invention.

In FIG. 3A a flow diagram of a typical operation sequence in accordance with the present invention is shown. In decision step 300, it is first determined if mute switch 108 on mobile 106 has been activated. If mute switch 108 has not been activated, the routine returns to the start. If the mute button 108 has been activated, the routine goes to step 302, where the editing of the portable's ID number occurs. If the ID number displayed in the mobile control head 110 is correct, the routine goes to decision step 304. In decision step 304, it is determined if the mobile's PTT has been activated, if it has not, the routine goes to decision step 326. An internal timer routine found inside of mobile 106 waits to see if any changes occur to the ID being displayed, or if the mobile PTT is pressed within a selected period of time. If neither occurs during the predetermined period of time, the routine exits and returns to the start. If the mobile PTT is pressed in step 304, mobile 106 transmits the mute ISW message in step 306. Another way of implementing the above steps is to automatically transmit the mute ISW as soon as mute switch 108 has been activated. This would assume that the portable ID was already known to be correct.

In decision step 308, mobile 106 determines if the return OSW from central controller 202 has occurred. If after a certain period of time no OSW has come in, the routine goes to decision step 328 where the mobile will retransmit the ISW message and wait for an OSW. If no response has occurred after several attempts (retry counter=0, normally caused by mobile 106 being out of range of system 200), the radio user is informed of the failed communication (via a displayed message, tone, etc.) in step 330 and the routine exits. If the OSW is received in step 308, portable 104 is muted in step 310. The above steps would require that mobile 106 is capable of monitoring the OSW that is directed to radio 104 which has a different radio ID than mobile 106 in system 200. This can be accomplished by making mobile 106 look for not only OSW's directed at its own ID, but also those for radio 104 during the short period of time the OSW should be coming back from central controller 202. After the OSW is received, mobile 106 could stop receiving OSW's directed to radio 104.

At this point the operation of the present invention (unmuting stage) goes to step 312, where it is determined if one of the vehicle doors 116 has been opened. If no door has been opened, it is then determined if the portable PTT has been depressed in step 314. If the portable PTT or other user control found in radio 104 has not been depressed, the routine goes back to step 312. If in step 312 the door has been determined to be opened, mobile 106 transmits an unmute ISW in step 316.

Figure 3B:
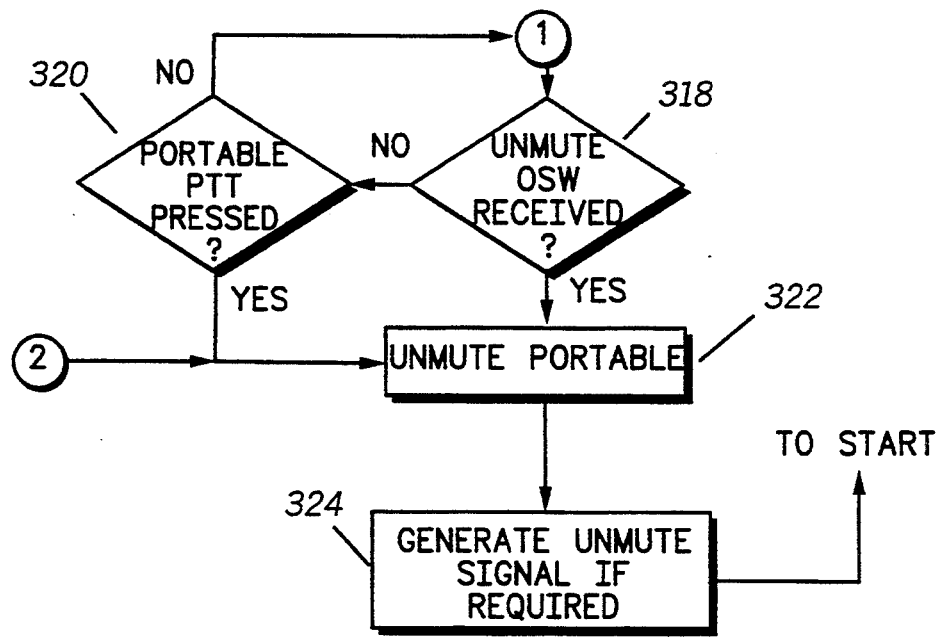
FIG. 3B is a continuation of the flow diagram of FIG. 3A.

Continuing on in FIG. 3B, in decision step 318, it is then determined if the unmute OSW has been received. Here although not shown, the same ISW retransmission sequence as shown in steps 328 and 330 can be used to retransmit the ISW a predetermined number of times if required. If in step 318 the unmute OSW is received, radio 104 is unmuted and in step 322 radio 104 returns to normal operation. If no unmute OSW has been received in step 318, in decision step 320 it is determined if the portable PTT has been pressed. If the PTT has been pressed, the operation goes to step 322 where the radio 104 is unmuted. Preferably, once radio 104 is unmuted, radio 104 generates an unmute signal (a specific tone "beep", flash an LED, etc.) to inform the portable user that the radio 104 is now in its normal mode of operation.

In order to make mobile 106 and portable radio 104 work in synchronization with each other as to when radio 104 is muted or unmuted, it will require that any time radio 104 is unmuted via the depression of it's PTT switch (as in steps 314 and 320) that an ISW be generated by radio 104. This would guarantee that a corresponding OSW is received at mobile 106 informing it that radio 104 is now unmuted when it becomes unmuted by the activation of the radio's PTT. This extra set of transmissions guarantees that the mobile 106 and portable 104 know exactly what condition (muted or unmuted) the portable 104 is in at all times.

Figure 4:
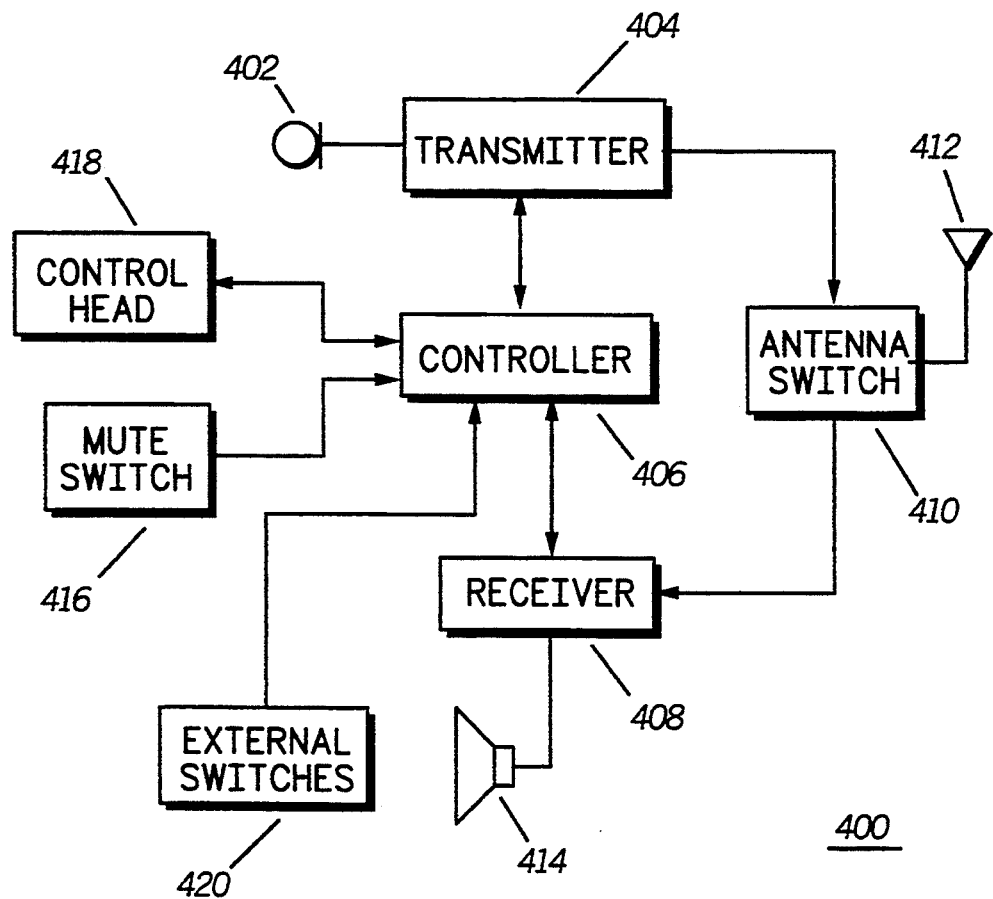
FIG. 4 is a block diagram of a communication device in accordance with the present invention.

In FIG. 4 a block diagram of a mobile radio 400 such as mobile 106 in accordance with the present invention is shown. Mobile 400 includes a conventional transmitter 404 having a microphone 402 and receiver 408 having a speaker as known in the art. Both transmitter 404 and receiver 408 are selectively coupled to antenna 412 via antenna switch 410. Also included as part of mobile 400 is a controller 406 which is preferably a microprocessor or microcontroller having appropriate I/O lines and memory capabilities as known in the art. Controller 406 controls all the operations of mobile 400 including the setting up of ISW packets and the decoding of OSW packets (both muting and unmuting OSW messages) as previously discussed in the above description. Coupled to controller 406 is mute switch 416 and control head 418. Other external switches 420 such as door switches 112 are also coupled to controller 406. When mute switch 416 is activated, a signal is sent to controller 406 informing it that a mute request has come in. Controller 406 then sends the presently stored radio ID to the radio display (not shown) if required and waits for the activation of its Push to Talk switch (not shown). Once the PTT is activated, controller 406 which acts as the muting means sets up a formatted data message (muting message ISW) comprising of the mute request plus the ID of the radio to be muted, in this case the ID of radio 104. This muting message is transmitted via transmitter 404 to central controller 202 via control channel 204.

After radio 104 is muted, the activation of one of the door switches 112, shown as external switches in FIG. 4, causes an unmute message to be transmitted by the radio 400. In this particular case, controller 406 receives a signal from the external switch 420 (door switch 112) that one of the selected doors 116 in vehicle 102 has been opened. This causes controller 406 acting as the unmuting means to generate an unmute ISW that is then transmitted by transmitter 404 to central controller 202.

Although a block diagram of portable radio 104 has not been shown, it is identical to FIG. 4 except that radio 104 does not have either a mute switch 416 or control head 418 in the preferred embodiment. A brief description of radio 104 using FIG. 4 will follow in order to fully understand the present invention. Radio 104 has a communication device controller means similar to controller 406. Controller 406 includes a conventional decoding software stored in the controller's memory locations for decoding the incoming muting and unmuting messages that are received by receiver 408 and then determining if they are valid or not. Controller 406 acts as the communication device muting means by muting speaker 414 once the muting message is received by a receiver 408. Once receiver 408 receives the muting message it is then sent to controller 406 for decoding. Controller 406 then determines if the muting OSW is valid and mutes speaker 414 if the OSW is determined to be valid. When radio 104 receives an unmuting message from central controller 202, controller 406 acts as the communication device unmuting means by decoding the unmuting message and sending a command to receiver 408 to unmute speaker 414 as soon as any transmissions are directed to radio 104.

In the present invention the mute condition which is preferably performed on radio 104 is that receiver 408 would be prevented from unsquelching speaker 414 under most conditions by controller 406. Only important transmissions such as emergency transmissions (optional capability) coming from central controller 202 could override the present invention. Although the types of conditions that could override the mute condition can be modified by reprogramming controller 406 in radio 104 to allow certain user defined conditions to over ride the mute condition.

The present invention can also be implemented without the need for either a system central controller like controller 202 or a base station in a non-trunked communication system. This could be accomplished by mobile radio 106 upon receiving the activation of mute switch 108 to transmit a very low power (e.g. less than 1 watt) mute message directly to radio 104. This could be done by mobile 106 automatically switching its transmit frequency to the receive frequency of radio 104 and thereupon transmitting the mute message to radio 104 (this assumes operation in a non-trunked system). The same operation could be performed when mobile 104 transmits the unmute message after the activation of one of the vehicle doors 116. The switching of the frequencies can be accomplished by controller 406 which would control the operating frequency of transmitter 404. Upon receiving either the mute or unmute messages, radio 104 could send a handshake message back to mobile 106 informing it that it properly received the message.

Although the above description has shown communication device 104 being a portable radio and communication device 106 being a mobile radio, different combinations of communication devices can be be used in the present invention. For example, a cellular radio and a mobile radio, two portable radios, etc. can used with the present invention.

The above discussed invention will allow a communication device user to use both a portable 104 and mobile 106 during daily operations without having to constantly turn the portable "off", when in the vehicle, and "on", when outside the vehicle. The present invention is very beneficial to people like police officers who constantly have problems with acoustic feedback caused by having to communication devices in close range to each other. The present invention also guarantees that no communications are missed by forgetting to turn "on" the portable radio upon existing the vehicle 102.

What is claimed is:

1. A communication system, comprising:

a first communication device mounted in a vehicle having a door, the first communication device having a transmitter for transmitting a muting message upon the activation of a mute control;

a door sensor for providing a door activation signal to the first communication device upon the opening of the door, the first communication device transmits an unmute message to the second device in response to receiving the door activation signal;

a second communication device having a receiver, a user control, and a communication device controller means coupled to the receiver for muting the second communication device upon the reception of the muting message and unmuting the second communication device upon the reception of the unmuting message, and wherein the first communication device is a mobile radio mounted in the vehicle and the second communication device is a portable radio.

2. The communication of claim 1, wherein the second communication device also unmutes if muted upon the activation of the user control found in the second communication device.

3. A method for muting and unmuting a communication device which is part of a communication system having first and second communication devices each having user controls and the first communication device being a mobile radio located in a vehicle having a door, the second communication device being a portable radio, the opening of the door is monitored by a door sensor which provides a door activation signal if the door is opened, the method for muting and unmuting comprising the steps of:

(a) activating a mute message from the first communication device;

(b) transmitting the mute message from the first communication device to the second communication device;

(c) receiving the mute message at the second communication device; and (d) muting the second communication device upon the successful reception of the mute message;

(e) transmitting an unmute message from the first communication device in response to the door activation signal;

(f) receiving the unmute message at the second communication device; and (g) unmuting the second communication device upon the successful reception of the unmute message.

4. A method for unmuting a portable radio, comprising the steps of:

(a) determining if a door of a vehicle has been opened;

(b) producing a door activation signal from a door sensor coupled to the door in response to the door being opened;

(c) transmitting an unmute message from a mobile radio located in the vehicle in response to the door activation signal;

(d) receiving the unmute message at the portable radio; and unmuting the portable radio in response to the successful reception of the unmute message.

5. A method for unmuting a radio as defined in claim 4, comprising the further step of:

(f) unmuting the portable radio if muted by activating a user control located in the portable radio.

6. A method for unmuting a radio as defined in claim 4, wherein step (c) comprises the steps of:

(c1) transmitting an unmute message from the mobile radio to a central controller;

(c2) receiving the unmute message at the central controller;

(c3) retransmitting the unmute message from the central controller to the portable radio.

7. A communication system, comprising:

a first radio located in a vehicle having a door;

a door sensor coupled to the door for providing a door activation signal when the door sensor is activated by the opening of the door;

the first radio including a transmitter for transmitting an unmute message in response to the door activation signal;

a second radio responsive to the unmute message, the second radio unmuting upon the reception of the unmute message, and wherein the first radio is a mobile radio mounted in the vehicle and the second radio is a portable radio.

8. A communication system as defined in claim 7, wherein the first radio further comprises a user control which when activated causes the first radio's transmitter to transmit a mute message to the second radio which causes the second radio to mute upon the second radio receiving the mute message.

9. A communication system as defined in claim 7, further comprising:

a central controller; and wherein the first radio transmits the unmute message to the central controller in response to the opening of the vehicle door, and the central controller upon receiving the unmute message retransmits the unmute message to the second radio.

10. A communication system as defined in claim 9, wherein the communication system is a trunked radio system.

* * * * *